US012719781B2

(12) United States Patent
Jones

(10) Patent No.: US 12,719,781 B2
(45) Date of Patent: Aug. 25, 2026

(54) DOWNSHIFT FOR BASE-T1L ETHERNET

(71) Applicant: Cisco Technology, Inc., San Jose, CA (US)

(72) Inventor: Peter G. Jones, Gilroy, CA (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 18/930,368

(22) Filed: Oct. 29, 2024

(65) Prior Publication Data

US 2025/0323859 A1 Oct. 16, 2025

Related U.S. Application Data

(60) Provisional application No. 63/634,259, filed on Apr. 15, 2024.

(51) Int. Cl.
*H04L 45/12* (2022.01)
*H04L 45/00* (2022.01)

(52) U.S. Cl.
CPC ............ *H04L 45/123* (2013.01); *H04L 45/22* (2013.01); *Y10S 370/91* (2013.01)

(58) Field of Classification Search
CPC ....... H04L 45/123; H04L 45/22; Y10S 370/91
See application file for complete search history.

(56) References Cited

U.S. PATENT DOCUMENTS 6,603,741 B1 * 8/2003 Poulter ................. H04L 5/1446 709/228
7,979,587 B1 7/2011 Lo
9,843,492 B2 12/2017 Bains et al.
2005/0165959 A1 7/2005 Huff
2006/0251158 A1 * 11/2006 Isachar ................... H04L 43/50 375/219
2015/0304248 A1 10/2015 Masood et al.
2015/0333866 A1 11/2015 Astigarraga et al.
2016/0352535 A1 * 12/2016 Hiscock ............ H04L 12/40136
2023/0081127 A1 3/2023 Zhang

OTHER PUBLICATIONS

Porter, Donovan, "100Base-T1 Ethernet: the evolution of automotive networking", Apr. 2018, Texas Instruments, pp. 1-11. (Year: 2018).*

(Continued)

*Primary Examiner* — Azizul Choudhury
(74) *Attorney, Agent, or Firm* — Patterson + Sheridan, LLP

(57) ABSTRACT

The present disclosure provides techniques for downshifting in 100BASE-T1L Ethernet. A device sends a first capability data frame to a connected peer device via a 100BASE-T1L interface. The device receives a second capability data frame from the connected peer device via the 100BASE-T1L interface. The device determines a first highest common denominator (HCD) for network speed based on the first and second capability data frames. The device establishes a network link with the connected peer device via the 100BASE-T1L interface using the first HCD for network speed. The device monitors a quality of the network link. Upon determining that the quality of the network link falls below a defined threshold, the device sends a third capability data frame to the connected peer device that excludes the first HCD for network speed.

18 Claims, 6 Drawing Sheets

(56) References Cited

OTHER PUBLICATIONS

Mueller, Harald, "IEEE 802.3dg '100 MB/s Long-Reach Single Pair Ethernet'", Nov. 2022, Endress + Hauser, pp. 1-14. (Year: 2022).*
Graber, Steffen, "IEEE 802.3dg Task Force, 100Base-T1L Long Reach Link Segment Ideas", Aug. 30, 2022, Pepperl+Fuchs, pp. 1-23. (Year: 2022).*
NPL_100BASE-T1L_Ethernet_T1 (Year: 2018).*
IEEE802.3dg (Year: 2022).*
IEEE802.3dg_TaskForce (Year: 2022).*
International Search Report and Written Opinion for International Application No. PCT/US2025/024573, mailed Jul. 22, 2025, 15 Pages.
Naumann K., et al., "NBASE-T Downshift: Optimization of 2.SGb/s and 5Gb/s Ethernet Data Rates Over Cat5e/Cat6 Cabling", Jan. 1, 2017, XP093291546, 5 Pages, Retrieved from https://archive.nbaset.ethernetalliance.org/wp-content/uploads/2017/05/NBASET-Downshift-WP-1217.pdf, The whole document.
NBASE-T Alliance: "NBASE-T Physical Layer Specification version 2.3", Jan. 1, 2016, XP093291540, pp. 1-14, Retrieved from http://ethernetalliance.org/wp-content/uploads/2024/05/NBASE-T-PHY-Spec-rev-2.3_final_Copyright.pdf, Sections 2.4.1, 24.3, 2.11, 2.11.1, 2.11.2.

* cited by examiner

Device 305

Device 310

Auto-Negotiation Frame with Device Capabilities 315-1

Auto-Negotiation Frame with Device Capabilities 315-2

320-1 Determine HCD for Speed 320-2 Determine HCD for Speed 330-1 Adjust Device Settings 330-2 Adjust Device Settings 335 Network Link Established 340-1 Monitor Link Quality 340-2 Monitor Link Quality 345-1 Perform Downshifting by Removing Current HCD Speed from Advertising 345-2 Perform Downshifting by Removing Current HCD Speed from Advertising Auto-Negotiation Frame with Updated Device Capabilities 350-1

350-2

355-1 Determine New HCD for Speed 355-2 Determine New HCD for Speed 360-1 Adjust Device Settings 360-2 Adjust Device Settings 365 Network Link Re-established

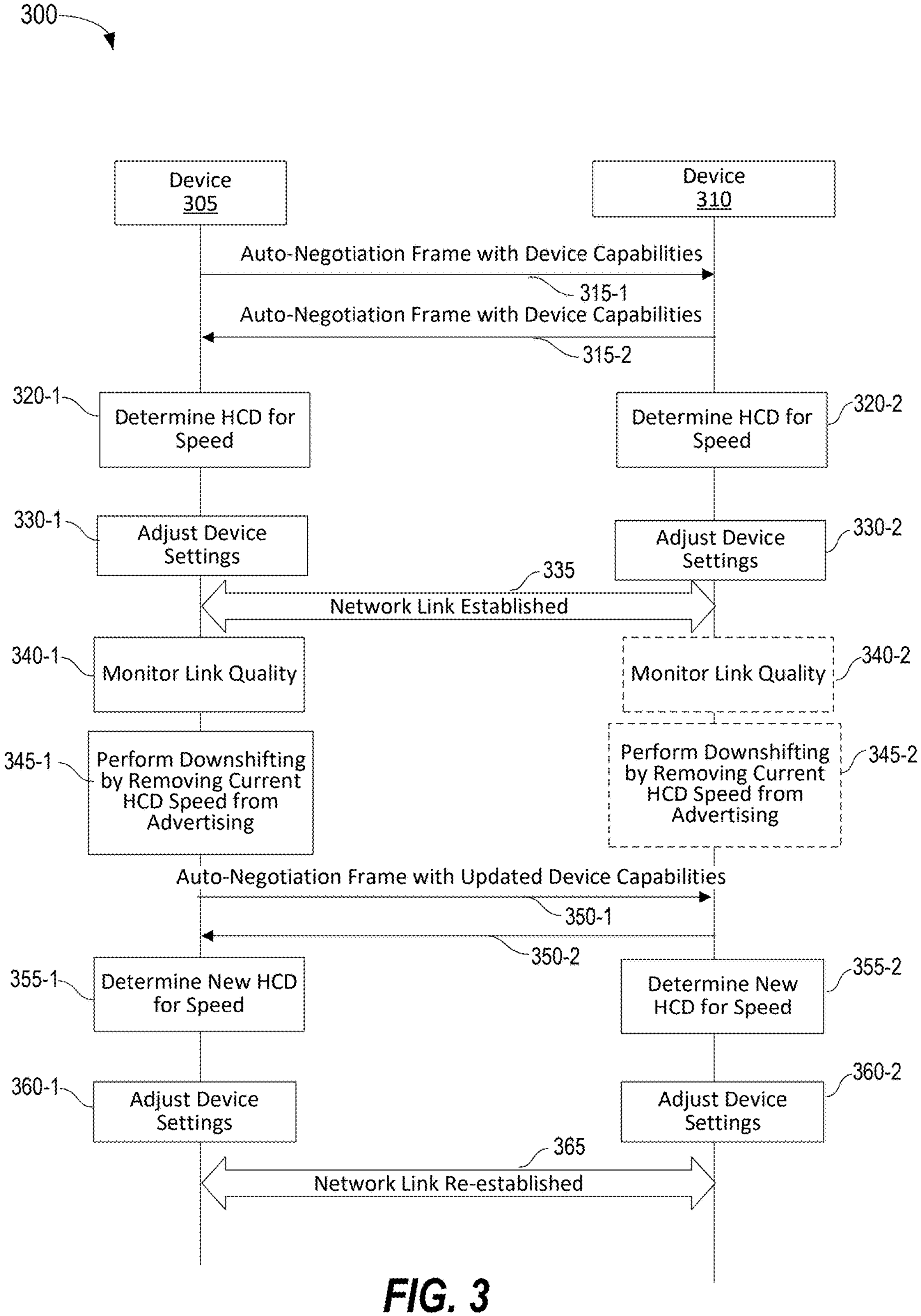

*FIG. 3*

DOWNSHIFT FOR BASE-T1L ETHERNET

CROSS-REFERENCE TO RELATED APPLICATIONS

This application claims benefit of co-pending U.S. provisional patent application Ser. No. 63/634,259 filed Apr. 15, 2024. The aforementioned related patent application is herein incorporated by reference in its entirety.

TECHNICAL FIELD

Embodiments presented in this disclosure generally relate to Ethernet connectivity. More specifically, embodiments disclosed herein relate to adaptive downshifting in BASE-T1L networks.

BACKGROUND

The IEEE 802.3 working group continuously develops Ethernet technology to meet the increasing demands for higher network data rates and efficiency across a wide range of environments. The IEEE 802.3cg Task Force has defined the 10BASE-T1L standard, which is designed to facilitate 10Mb/s Ethernet communications over a distance up to at least 1000 meters using a single twisted pair cable. The 10BASE-T1L standard intends to replace existing serial protocols such as Building Automation and Control Network (BACnet), DeviceNet, which are commonly used in building automation and industrial automation settings, and operate at speeds ranging from tens (10s) to hundreds (100s) of Kb/s over comparable single pair cabling infrastructure. Building on the capabilities of 10BASE-T1L, the IEEE P802.3dg Long-Reach Single Pair Ethernet Task Force is working on the 100BASE-T1L as a follow-up to 10BASE-T1L, which is designed to deliver 100 Mb/s speeds over a distance up to at least 500 meters using a single pair cable. The new standard represents a tenfold increase in data transfer speed over 10BASE-T1L while maintaining benefits such as utilizing existing signal-pair copper cabling. The 100BASE-T1L standard is expected to be particularly useful for applications that require higher bandwidth to support more complicated automation and control technologies.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 depicts an example sequence for two devices adaptively downshifting network settings through auto-negotiation, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
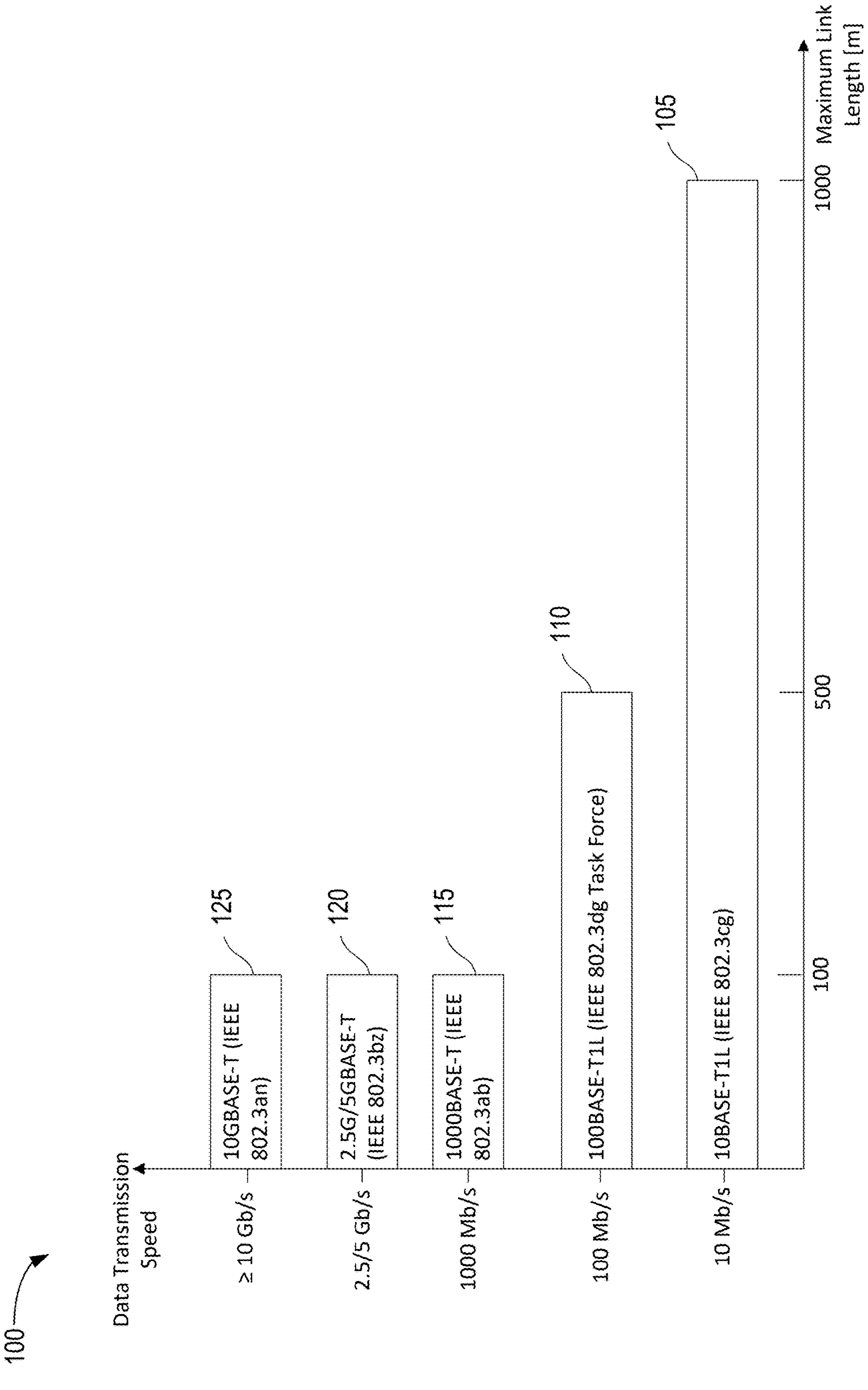
FIG. 1 depicts Ethernet capabilities across a range of data transfer speeds from 10 Mb/s to 10 Gb/s, including 100BASE-T1L standard, according to some embodiments of the present disclosure.

One embodiment presented in this disclosure provides a method, including sending, by a device via a 100BASE-T1L interface, a first capability data frame to a connected peer device, receiving, by the device via the 100BASE-T1L interface, a second capability data frame from the connected peer device, determining, by the device, a first highest common denominator (HCD) for network speed based on the first and second capability data frames, establishing, by the device, a network link with the connected peer device via the 100BASE-T1L interface using the first HCD for network speed, monitoring, by the device, a quality of the network link, and upon determining, by the device, that the quality of the network link falls below a defined threshold, sending a third capability data frame to the connected peer device that excludes the first HCD for network speed.

Other embodiments in this disclosure provide one or more non-transitory computer-readable media containing, in any combination, computer program code that, when executed by operation of a computer system, performs operations in accordance with one or more of the above methods, as well as a system of a device comprising one or more computer processors and one or more memories collectively containing one or more programs, which, when executed by the one or more computer processors, perform operations in accordance with one or more of the above methods.

EXAMPLE EMBODIMENTS

The present disclosure introduces methods for implementing downshifting techniques into 10/100BASE-T1L Ethernet, to enhance the stability of connections over existing single pair cabling infrastructure.

2.5G/5GBASE-T, defined by IEEE 802.bz, supports higher speeds (e.g., 2.5Gb/s, 5Gb/s) over cabling infrastructure (e.g., Cat5e/6 cabling) originally designed for lower speeds (e.g., 1Gb/s or lower). The implementation of the 2.5G/5GBASE-T standards presents practical challenges, particularly when the quality of these legacy cables is insufficient to support the highest common denominator (HCD) speed determined by Ethernet auto-negotiation. In such situations, the devices at both ends of the cable may continuously renegotiate link speeds due to poor link quality, which can significantly degrade the user experience.

Incorporated in the NBASE-T Physical Layer Specification, downshifting techniques involve monitoring the link's up/down behavior and adjusting the negotiated speed downward when excessive link failures occur within a specified time frame. By resetting the auto-negotiation to exclude the HCD speed that results in unstable connections, the devices can settle on a lower but more stable speed. Such downward speed shifting may improve the overall network reliability.

Embodiments of the present disclosure introduce a method for integrating downshifting into BASE-T1L Ethernet, such as 100BASE-T1L. 100BASE-T1L is designed to deliver 100 Mb/s across a distance up to at least 500 meters using single pair cabling infrastructure. In some embodiments, the single pair copper cables may have been originally installed for much lower speeds (e.g., tens to hundreds of Kb/s) under protocols such as BACnet or DeviceNet. The higher speeds required by 100BASE-T1L can be challenging for such existing installations due to interference from neighboring cables or environmental noise from various sources (e.g., HVAC systems, large electric motors, and fluorescent lighting). The variations in environmental conditions may affect link stability. To mitigate these issues, adaptive downshifting techniques may be implemented to enhance the stability and reliability of the network connections under BASE-T1L. By enabling auto-negotiation to dynamically adjust the HCD speed, the system ensures that even if the highest supported speed (by devices at both ends of a 10/100BASE-T1L cable) is not sustainable, the connection remains stable at a reduced speed. This method of integrating downshifting into BASE-T1L may help maintain network connectivity by automatically adjusting to the most stable speed supported by existing cabling infrastructure, and therefore optimize the overall network performance. Also, by making existing cables feasible for running newer and faster Ethernet techniques, downshifting expands the practical applications of 10/100BASE-T1L.

FIG. 1 depicts Ethernet capabilities across a range of data transfer speeds from 10 Mb/s to 10 Gb/s, including 100BASE-T1L standard, according to some embodiments of the present disclosure. As illustrated, the data transfer speeds (measured in Mb/s or Gb/s) are represented by the vertical axis, and the maximum effective cable lengths (measured in meters) are represented by the horizontal axis. The figure illustrates the relationship between speed capability and distance limitations for each standard.

As illustrated, the standard 10BASE-T1L standard (105), defined in IEEE 802.3cg, supports relatively low data transfer speeds of about 10 Mb/s up to at least 1000 meters. This standard (105) is suitable for applications requiring long reach with lower speed demands. Following the 10BASE-T1L (105), the 100BASE-T1L standard (110), defined in IEEE P802.3dg 100 Mb/s Long-Reach Single Pair Ethernet Task Force and adopted as of May 2024, is designed to deliver data transfer speeds up to 100 Mb/s speeds across a distance up to at least" 500 meters. For higher data speeds exceeding 100 Mb/s, BASE-T1L standards (105 and 110) are not applied. Instead, other Ethernet standards under BASE-T are utilized to provide these higher speeds (up to more than 10 Gb/s), with limitations on maximum cable length and cable construction (e.g., single copper pair vs 4 copper pair) compared to BASE-T1L. As illustrated, 1000BASE-T standard (115), defined under IEEE 802.3ab, offer data transfer speeds up to 1 Gb/s over cable lengths of up to at least 100 meters. The standard (115) are widely used in office buildings and data centers where high-speed data transmission is required over relatively short distances. Further extending the speed capabilities, 2.5G/5GBASE-T standards (120), defined under IEEE 802.3bz, support data transfer speeds up to 2.5 Gb/s and 5 Gb/s, respectively, and 10GBASE-T standard (125), defined under IEEE 802.3an, offer up to 10 Gb/s speeds. Like 1000BASE-T (115), 2.5G/5GBASE-T (120) and 10GBASE-T (125) standards are limited to cables up to at least 100 meters. The specified Ethernet capabilities like speed and/or distance are theoretical maximums under ideal conditions. In real-world deployments, the actual reliable speed and distance may be less due to interference (e.g., electromagnetic interference from nearby electrical equipment, or environmental factors like temperature and humidity).

Unlike 1000BASE-T (115) and 10GBASE-T (125), where the requirements align closely with the cable's supported speeds—for example, 1000BASE-T (115) requires Category 5e cables originally designed to support Ethernet speeds up to 1 Gb/s, and 10GBASE-T (125) requires Category 6*a* cables designed to fully support 10 GB/s Ethernet speeds—2.5G/5GBASE-T standards (120) are specifically designed for higher network speeds (like 2.5 Gb/s or 5Gb/s) over existing Category 5e and Category 6 cables that were originally installed for networks running at 1 GB/s or lower Ethernet speeds. In other words, the 2.5G/5GBASE-T standards (120) are designed for higher speeds over cables not originally intended for such rates. By implementing these standards, organizations can reuse existing infrastructure without upgrades to improve network speeds.

However, as discussed above, there are practical challenges in the implementation of these higher speeds, particularly when the legacy cables cannot support the HCD speed determined through Ethernet auto-negotiation.

Similar to the 2.5G/5GBASE-T standards (120), the 10/100BASE-T1L standards (105 and 110) intend to use existing installed single pair cables to provide significantly improved data transfer speeds. These existing single pair cables were originally designed following the serial protocols like BACnet and DeviceNet, and commonly used in building automation and industrial automation environments. These cables typically operate at lower speeds ranging from 10s to 100s of Kb/s, which are insufficient to satisfy the increasing operational demands of more data-intensive applications. By implementing the 10/100BASE-T1L standards (105 and 110), organizations may utilize the same single pair copper cabling infrastructure to achieve higher data speeds (up to 10 Mb/s or potentially 100 Mb/s, respectively). This approach can effectively improve the capacity and efficiency of network systems without the need for extensive and costly infrastructure upgrades. Moreover, even if the existing cables eventually prove inadequate for future needs, the established pathway may serve as conduits for pulling new, higher-capacity cables through the same ducts. The reuse of physical topology simplifies future upgrades and reduces installation costs for new cables.

However, since 10/100BASE-T1L standards (105 and 110) are applied to cables that were originally designed for lower speeds (e.g., 10s to 100s of Kb/s), link failures may occur frequently when the cables are not able to support the upgraded speeds (like 10 Mb/s or potentially 100 Mb/s, respectively). To address this issue, in some embodiments, downshifting techniques may be applied in the 10/100BASE-T1L Ethernet, to ensure that the network remains stable and efficient even under suboptimal cabling conditions. More detail about the implementation of the downshifting techniques is discussed below with reference to FIGS. 3 and 4.

Figure 2:
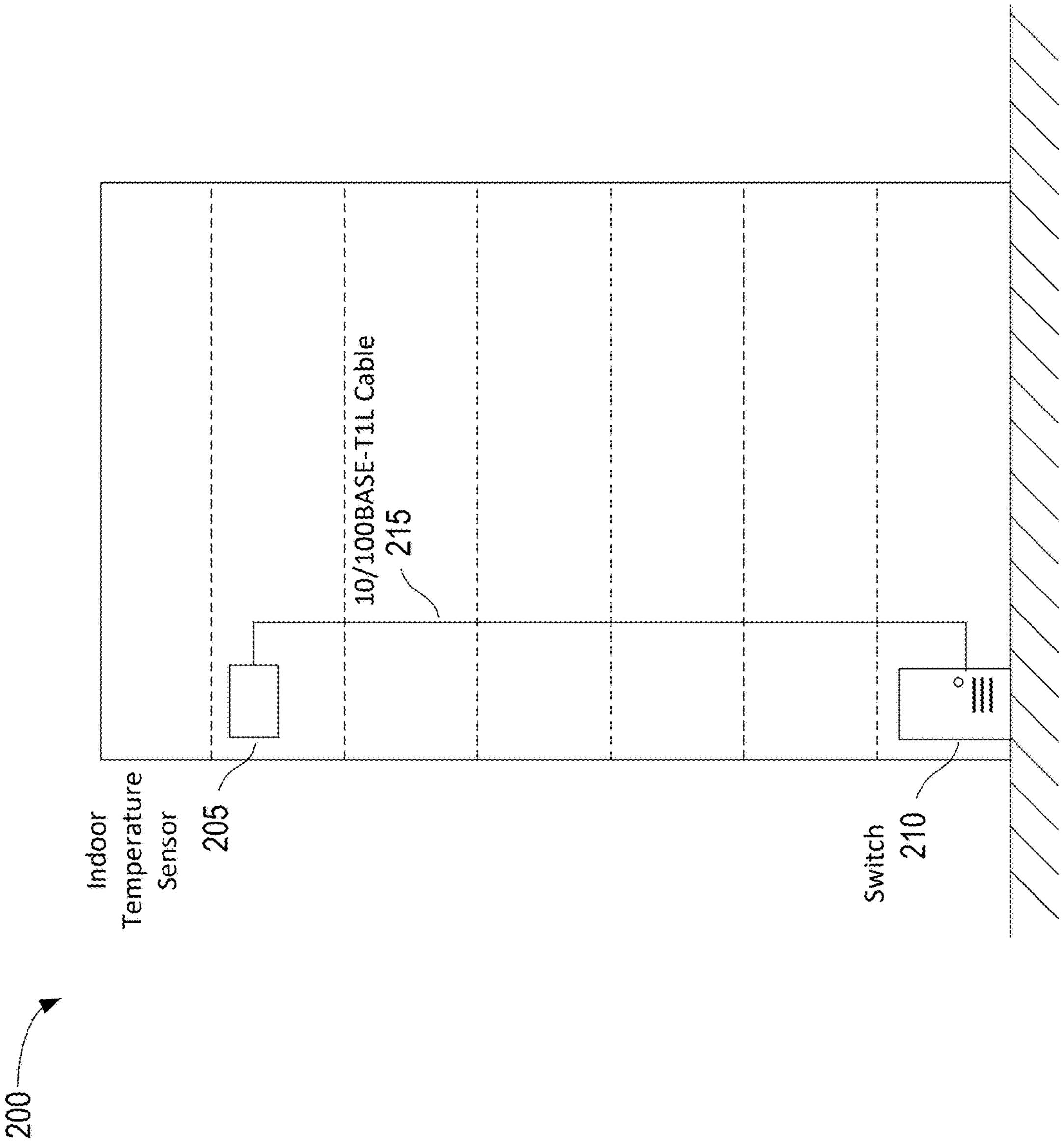
FIG. 2 depicts an example environment illustrating the application of 10/100BASE-T1L standards to enhance network infrastructure within a building, according to some embodiments of the present disclosure.

FIG. 2 depicts an example environment 200 illustrating the application of 10/100BASE-T1L standards to enhance network infrastructure within a building, according to some embodiments of the present disclosure.

As illustrated, an indoor temperature sensor 205 is connected to a network switch 210 via an existing installed cable 215. The cable 215 follows existing serial protocols such as BACnet or DeviceNet, which were originally designed to operate at lower speeds ranging from 10s to 100s of Kb/s. Following the implementation of 10/100BASE-T1L standards (e.g., 105 and 110 of FIG. 1), the cable 215 now can be utilized to transmit data at significantly higher speeds (i.e., 10 Mb/s or 100 Mb/s). The upgrade allows the indoor temperature sensor 205 to communicate with the network switch 210 more at much higher rates, and enables the adoption of the modern protocols seen in the Internet today. Use of Ethernet and adoption of modern protocols enables major improvements in the capabilities of the building's monitoring and control system.

Since the legacy cable 215 was originally designed for lower speeds (e.g., 10s to 100s of Kb/s), there may be situations where the cable 215 cannot maintain a link at the high speeds required by 10/100BASE-T1L through auto-negotiation. The link failure may be caused by various factors, including, but not limited to, interferences from neighboring cables, or environmental noise from other systems or equipment (e.g., HVAC systems, large electric motors, and fluorescent lighting). In this configuration, due to the frequent link failures, the indoor temperature sensor 205 and the switch 210 may continuously renegotiate link speeds, making the network unstable and degrading its performance. To address the issue, in some embodiments, adaptive downshifting may be applied to ensure reliable communication.

For example, suppose both the indoor temperature sensor 205 and the switch 210 support 10BASE-T1L and 100BASE-T1L. Through Ethernet auto-negotiation, the HCD for speed is identified at 100 Mb/s, and a link at 100 Mb/s is established in the cable 215 following 100BASE-T1L standard connecting the indoor temperature sensors 205 to the switch 210. However, due to wear and tear or interference from other sources, the link quality deteriorates and fails frequently, prompting the two devices to renegotiate. As discussed above, frequent renegotiations may lead to network instability, and therefore significantly degrade the user experience. Downshifting may resolve this issue by monitoring the frequency of these failures. If either of the devices (e.g., the indoor temperature sensor 205 or the switch 210) detects that the link at 100 Mb/s fails more often than an acceptable threshold (e.g., a certain number of link failures over a defined period of time), it may automatically initiate a downshift in speed. For example, the switch may remove speeds above 100 Mb/s from its advertising, and subsequent renegotiation between the two devices may settle on an HCD speed of 10 Mb/s. While this speed is slower, it can provide a more stable and reliable connection under the current cabling conditions. By selecting a speed that the existing cabling can more reliably support, the downshifting stabilizes the network, and/or optimizes the overall performance by preventing continuous renegotiations (which consume network resources and disrupt data transmission).

Although the example environment 100 depicts an indoor temperature sensor 205 that benefits from the implementation of 10/100BASE-T1L Ethernet standards and downshifting techniques, the example is only provided for conceptual clarity. In some embodiments, many other types of sensors or equipment used in building automation or industrial automation settings may also be integrated into the network using similar technologies, such as humidity sensors, CO2 sensors, light sensors, smoke and fire detectors, and HVAC equipment.

FIG. 3 depicts an example sequence 300 for two devices adaptively downshifting network settings through auto-negotiation, according to some embodiments of the present disclosure.

As illustrated, devices 305 and 310 initiate communication by auto-negotiation to determine the highest data transfer rate that both devices can support reliably. In some embodiments, device 305 may correspond to the indoor temperature sensor 205 as depicted in FIG. 2, and device 310 may correspond to the switch 210 as depicted in FIG. 2. The devices 305 and 310 may be connected via a cable that supports 10/100BASE-T1L Ethernet standards.

In this illustrated example, both devices 305 and 310 send auto-negotiation frames to each other (as depicted by 315-1 and 315-2). Each frame includes information about the device's capabilities, which include supported data transfer speeds, and other relevant Ethernet features. Both devices 305 and 310 independently compare the received capabilities with their own capabilities, and determine the HCD for speed (as depicted by 320-1 and 320-2). For example, if device 305 and device 310 support both 10BASE-T1L and 100BASE-T1L, the HCD for speed would be 100 Mb/s, as it is the highest speed both devices can support . . .

Following the determination of the HCD, the two devices 305 and 310 configure themselves to operate at the selected speed (as depicted by 330-1 and 330-2 and establish the link at the negotiated speed (as depicted by 335). In the example mentioned above, the link is established at 100 Mb/s.

In some embodiments, with the link established (as depicted by 335), both devices 305 and 310 may start transmitting data between each other over the established Ethernet link. As illustrated, both devices 305 and 310 monitor the link quality independently to ensure ongoing reliability (as depicted by 340-1 and 340-2). In some embodiments, both devices 305 and 310 may monitor the link failure rate to determine the quality. As used herein, link failure rate may be defined as the number of times a link fails to maintain connectivity per unit of time (e.g., every second, every minute). As used herein, a failure may refer to an event where one or more of the link's performance parameters (e.g., defined by link failure rate, bit error rate or packet error rate) drops below acceptable limits. The drops in performance may necessitate the re-establishment of the connection. In some embodiments, these performance limits may be set based on the performance levels required for the network's applications to function properly.

Both devices 305 and 310 independently monitor link failure rate (as depicted by 340-1 and 340-2) and, upon determining that the rate exceeds a defined threshold (e.g., 5 failures per minute) that may affect overall network performance, each device performs a downshifting action (as depicted by 345-1 and 345-2). In some embodiments, the downshifting may involve removing the current HCD speed from its advertised capabilities. Both devices 305 and 310 may then send an auto-negotiation frame to each other with the updated capabilities (as depicted by 350-1 and 350-2). In the example mentioned above, upon determining that the link operating at 100 Mb/s and full duplex mode is unstable (with a failure rate exceeding a defined threshold), then both devices 305 and 310 may independently remove the 100 Mb/s from their advertising capabilities.

In some embodiments, the link quality monitoring may be performed by a single device, such as device 305 (as depicted by 340-1). If device 305 determines that the established link operating at 100 Mb/s is unstable, it may remove the 100 Mb/s from its advertised capabilities (as depicted by 345-1), and send an updated auto-negotiation frame to device 310 (as depicted by 350-1).

Based on the updated capabilities, both devices 305 and 310 independently determine a new HCD for speed (as depicted by 355-1 and 355-2). In some embodiments, the new HCD for speed may correspond to a lower speed (e.g., 10 Mb/s) than the initial HCD (e.g., 100 Mb/s). In the example mentioned above, after the 100 Mb/s is removed, the new HCD for speed between the two devices becomes 10 Mb/s.

Each device 305 or 310 then independently adjusts its settings to the new selected speed (as depicted by 360-1 and 360-2). If both devices' settings match, the network link is reestablished at the new configuration (e.g., 10 Mb/s) (as depicted by 365). By deploying BASE-T1L standards (such as 10BASE-T1L and the proposed 100BASE-T1L) with downshifting capabilities, the network speed over existing single pair cables can be automatically adjusted to the highest stable rate that the cables can support. The adjustment addresses the technical challenges associated with applying BASE-T1L standards, particularly in settings where the original cabling was not intended for high-speed data transmission. The capability to downgrade speeds dynamically can prevent frequent disconnections or data transmission errors, and therefore improve the stability and efficiency of data transmission.

Figure 4:
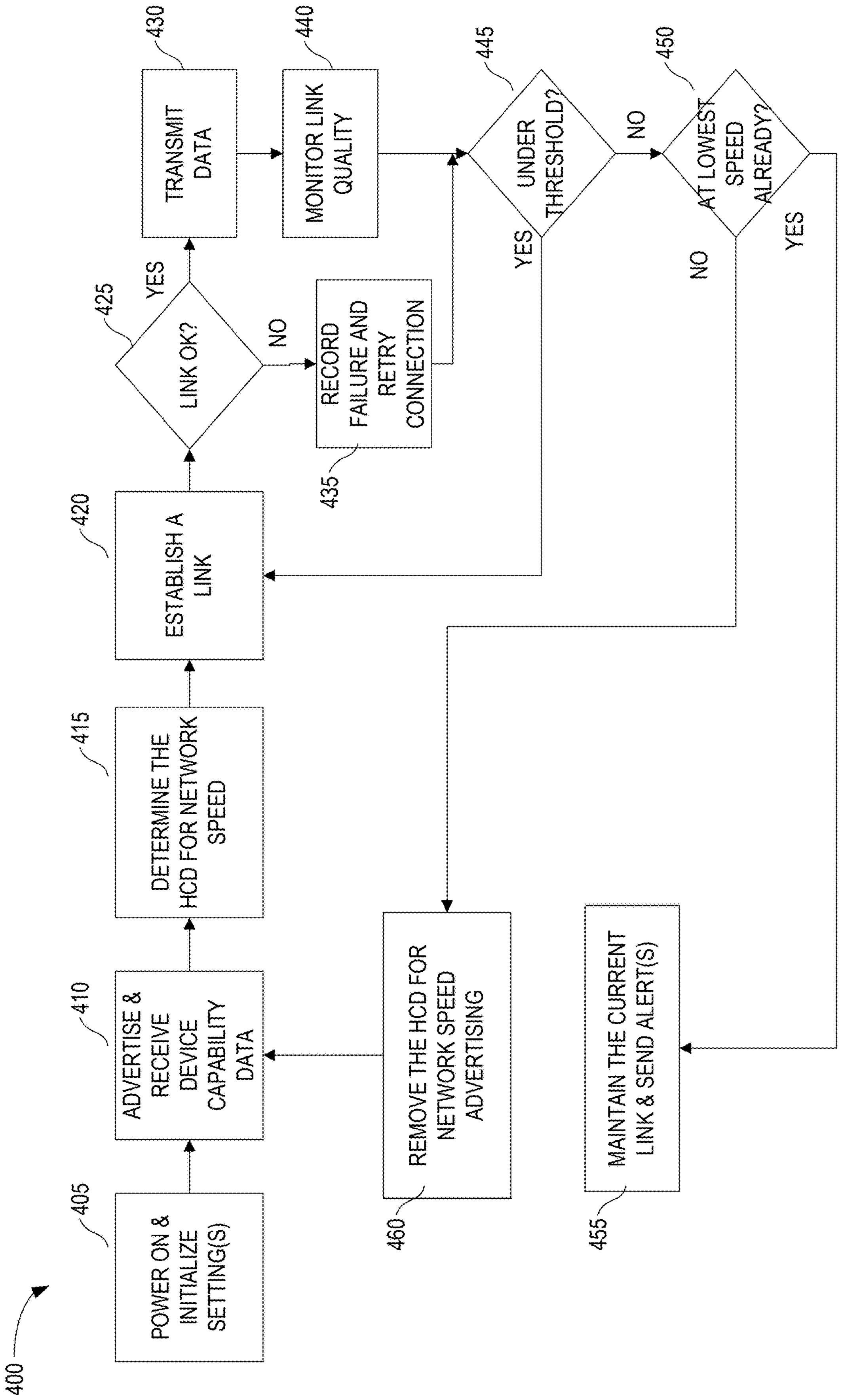
FIG. 4 depicts an example method in which a device auto-negotiates the highest common denominator (HCD) network speed with its connected peer device and downshifts to a lower speed upon determining the link quality falling below a defined threshold, according to some embodiments of the present disclosure.
Figure 6:
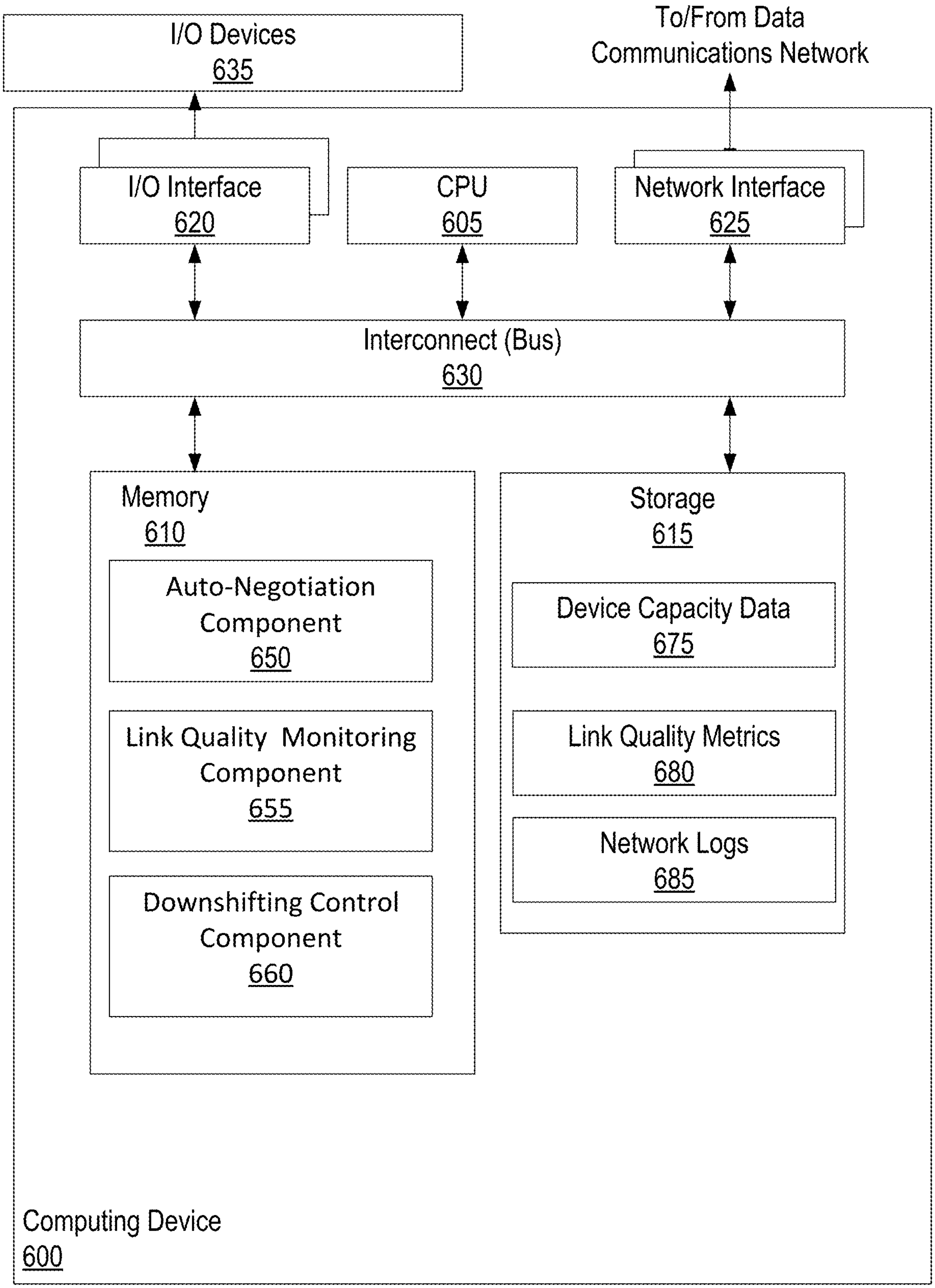
FIG. 6 depicts an example computing device configured to perform various aspects of the present disclosure, according to some embodiments of the present disclosure.

FIG. 4 depicts an example method 400 in which a device auto-negotiates the highest common denominator (HCD) network speed with its connected peer device and downshifts to a lower speed upon determining the link quality falling below a defined threshold, according to some embodiments of the present disclosure. In some embodiments, the method 400 may be performed by one or more computing devices, such as the indoor temperature sensor 205 or the switch 210 as depicted in FIG. 2, the device 305 or 310 as depicted in FIG. 3, or the computing device 600 as depicted in FIG. 6.

At block 405, a computing device (e.g., indoor temperature sensor 205 of FIG. 2) powers on and initializes its hardware and/or software settings to prepare for network communication.

At block 410, the computing device performs auto-negotiation, where it advertises the network capabilities, such as supported speeds and duplex modes, to its connected peer device (e.g., the switch 210 of FIG. 2). The device also receives capability information from its connected peer device, which may occur either simultaneously (in parallel) or sequentially (in series) after its own capabilities have been sent. In some embodiments, the capability information may be communicated using specific Ethernet frames, like auto-negotiation frames. In some embodiments, the device and its peer may be connected via a cable originally installed following existing protocols (e.g., BACnet or DeviceNet). Despite these legacy purposes, the cable may also be compatible with 10/100BASE-T1L standards, which allow for efficient and reliable transmission of auto-negotiation frames between the devices.

At block 415, based on its own capabilities and the received capability information of the peer device, the computing device determines the HCD for speed that both devices support. In some embodiments, the peer device (e.g., the switch 210 of FIG. 2) may independently determine the HCD for speed that both devices support, based on its own capabilities and the capabilities advertised by the device (e.g., the indoor temperature sensor 205 of FIG. 2).

At block 420, the computing device configures itself to the speed it determines at block 415. The peer device, simultaneously or sequentially, configures its settings to the speed the peer device determines at block 415. When both devices' settings match, a network link is automatically established.

At block 425, the computing device checks whether the link is stable and functioning properly. If it is determined that the link is stable and functioning properly, the method 400 proceeds to block 430, where the computing device begins transmitting and/or receiving data via the established link. If the link is not responsive, the method 400 proceeds to block 435.

At block 435, the computing device records the occurrence of the link drop/failure and attempts to reestablish the connection. In some embodiments, the attempt may be made a certain number of times or within a defined timeout period. After the retry attempts, the method 400 proceeds to block 445.

At block 440, the computing device monitors and analyzes the link quality, specifically focusing on the link failure rate. As used herein, the link failure rate may refer to the frequency at which the link fails to maintain connectivity or meet performance standards (e.g., 5 failures per minute). As used herein, a link failure may be defined as an event where one or more of the link's performance parameters (e.g., data transfer rate, packet loss, latency and jitter) are below acceptable limits that may cause the link to become completely unresponsive or require a reestablishment of the connection. In some embodiments, the link failure rate may be determined based on the records generated at block 435.

At block 445, if the link failure rate is below a defined acceptable threshold, it indicates that the link is functioning adequately (despite the possibility of occasional link drops). In this configuration, the method 400 proceeds to block 420, where the computing device maintains the established link, and continues operating with the current speed and/or duplex mode. If the link failure rate is equal to or above the defined threshold, it suggests that the link failures are frequent or severe enough to affect the overall performance and stability of the network. In this configuration, the method 400 proceeds to block 450.

In some embodiments, occasional link drops or failures may occur due to transient issues or minor disturbances. Therefore, the threshold may be set to tolerate these occasional drops and to guard against too frequent link drops that significantly impact network operations. When setting the threshold, various factors may be considered, including, but not limited to network requirements, expected performance levels, historical data and performance, and environmental factors. For example, for video streaming services that require high reliability and low latency, a lower threshold may be set to ensure consistent quality of service. When the computing devices are in environments with a high potential for interference, such as buildings or industrial areas with heavy machinery, a higher threshold may be set to tolerate occasional drops caused by interference.

In some embodiments, given the broader gap between the capabilities of the cabling infrastructure (e.g., 10 s-100 s Kb/s) and the intended high speeds of 100BASE-T1L (e.g., 100 Mb/s), the application of downshifting techniques to this standard may involve a more complex decision-making process. For example, while in 10BASE-T1L, the link quality threshold for downshifting may simply be set based on the link failure rate, in 100BASE-T1L, the threshold for initiating downshifting may need to be dynamically adjusted based on the current network load, the type of data being transmitted, and real-time network conditions. Furthermore, the link quality threshold in 100BASE-T1L may incorporate multiple performance metrics, such link failure rate, bit error rate or packet error rate, each weighted differently depending on their impact on the overall network performance.

At block 450, the computing device checks whether the current HCD for speed is the lowest speed the device supports. If the HCD for speed is already the lowest speed (e.g., if the device supports speeds down to 10 Mb/s and the current HCD for speed is 10 Mb/s), the method 400 proceeds to block 455, where the computing device continues to maintain the established link at this speed. In some embodiments, the device may send an alert to the network monitoring system, indicating that the network is operating at minimum capacity. The monitoring system, upon receiving the alert, may conduct further investigation or upgrade the cabling infrastructure. If the HCD for speed is not at the lowest speed (e.g., if the device supports speeds down to 10 Mb/s and the current HCD for speed is 100 Mb/s), the method 400 proceeds to block 460, where the computing device removes the current HCD speed (e.g., 100 MB/s) from its advertised capabilities. The device then renegotiates with its peer device to establish a new and more stable link operating at a lower speed (e.g., 10 Mb/s). As such, the downshifting enables the device to find a more reliable operational speed that prevents frequent link failures and enhances overall network performance.

Figure 5:
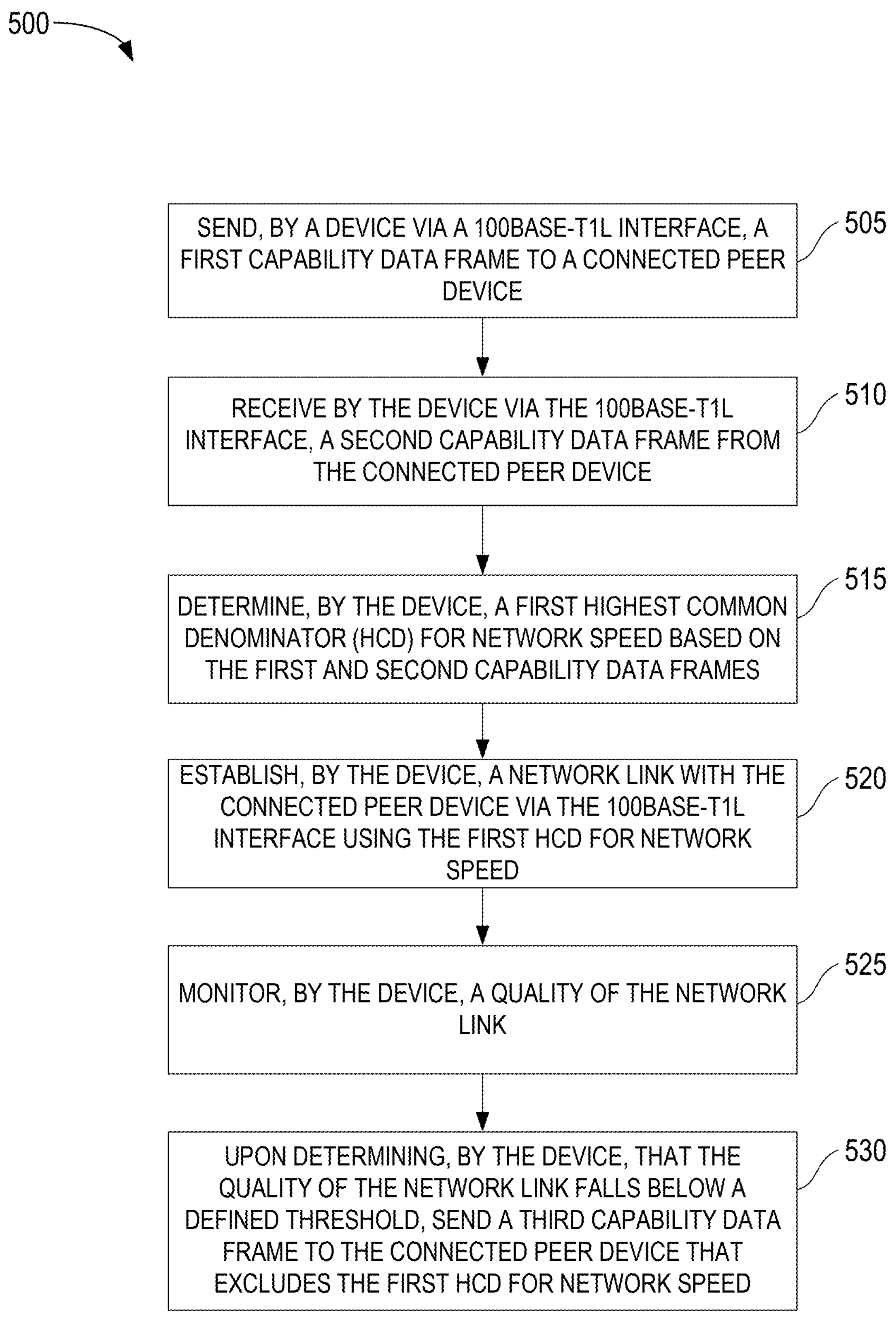
FIG. 5 is a flow diagram depicting an example method for downshifting in 100BASE-T1L networks, according to some embodiments of the present disclosure.

FIG. 5 is a flow diagram depicting an example method 500 for downshifting in 100BASE-T1L networks, according to some embodiments of the present disclosure.

At block 505, a computing device (e.g., indoor temperature sensor 205 of FIG. 2) sends a first capability data frame to a connected peer device via a 100BASE-T1L interface (e.g., cable 215 of FIG. 2).

At block 510, the computing device receives a second capability data frame from the connected peer device (e.g., switch 210 of FIG. 2) via the 100BASE-T1L interface.

At block 515, the computing device determines a first highest common denominator (HCD) for network speed based on the first and second capability data frames (as depicted by 320 of FIG. 3).

At block 520, the computing device establishes a network link with the connected peer device via the 100BASE-T1L interface using the first HCD for network speed (as depicted by 335 of FIG. 3).

At block 525, the computing device monitors a quality of the network link (as depicted by 340 of FIG. 3).

At block 530, upon determining that the quality of the network link falls below a defined threshold, the computing device sends a third capability data frame to the connected peer device that excludes the first HCD for network speed (as depicted by 345 of FIG. 3).

In some embodiments, the first capability data frame may comprise one or more network speeds supported by the device, and the second capability data frame may comprise one or more network speeds supported by the connected peer device.

In some embodiments, to monitor the quality of the network link, the computing device may monitor at least one of link failure rate, bit error rate or packet error rate.

In some embodiments, the computing device may further renegotiate with the connected peer device to determine a second HCD for network speed, where the second HCD for network speed is lower than the first HCD for network speed, and adjust, by the device, the network link with the connected peer device via the 100BASE-T1L interface to the second HCD for network speed.

In some embodiments, the computing device may further assess whether the first HCD for network speed is a lowest speed that the device can operate on, and upon determining that the first HCD for network speed is the lowest speed that the device can operate on, maintain the network link at the first HCD for network speed. In some embodiments, the computing device may further send an alert to a network monitoring system, the alert indicating that the network link is operating at a minimum capacity.

In some embodiments, the connected peer device may performs at least one of operations comprising: monitoring the quality of the network link; and upon determining that the quality of the network link falls below a second defined threshold, sending a fourth capability data frame to the device that excludes the first HCD for network speed.

FIG. 6 depicts an example computing device 600 configured to perform various aspects of the present disclosure, according to some embodiments of the present disclosure. In some embodiments, the computing device 600 may correspond to the indoor temperature sensor 205 or the switch 210 as depicted in FIG. 2. In some embodiments, the computing device 600 may correspond to the device 305 or 310 as depicted in FIG. 3.

As illustrated, the computing device 600 includes a CPU 605, memory 610, storage 615, one or more network interfaces 625, and one or more I/O interfaces 620. Each of the components is communicatively coupled by one or more buses 630.

The CPU 605 is generally representative of a single central processing unit (CPU) and/or graphic processing unit (GPU), multiple CPUs and/or GPUs, a microcontroller, an application-specific integrated circuit (ASIC), or a programmable logic device (PLD), among others. The CPU 605 processes information received through the I/O interface 620 and/or the network interface 625. The CPU 605 retrieves and executes programming instructions stored in memory 610, as well as stores and retrieves application data residing in storage 615. The I/O interface enables data exchange between the computing device's internal components with external I/O devices 635 (e.g., keyboards, mice, and printers).

The memory 610 may include random access memory (RAM) and read-only memory (ROM). The memory 610 may store processor-executable software code containing instructions that, when executed by the CPU 605, enable the device 600 to perform various functions described herein for wireless communication. In the illustrated example, the memory 610 includes three software components: the auto-negotiation component 650, the link quality monitoring component 655, and the downshifting control component 660. In some embodiments, the auto-negotiation component 650 may be configured to negotiate with a peer device for speed that both devices support. In some embodiments, the auto-negotiation component 650 may advertise its capabilities to the connected peer device, receive capability data from the connected peer device, process the data to determine the HCD for network speed and/or duplex mode, and establish a link by configuring the device's 600 network settings to the determined speed and/or duplex mode. In some embodiments, the link quality monitoring component 655 may be designed to manage the data transmission over the established link, and monitor the link quality to ensure stable and efficient network communication. In some embodiments, the link quality monitoring component 655 may use link failure rate to measure link quality, and compare the link failure rate with a predefined threshold. In some embodiments, the downshifting control component 660 may be configured to initiate downshifting operations, upon determining the link failure rate exceeding a predefined threshold. In some embodiments, the downshifting operations may include adjusting the advertised capabilities (like supported speeds or duplex modes), and renegotiating with the peer device to establish a new HCD with more stable link conditions.

The storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN). The storage 615 may store a variety of data for the efficient functioning of the system. The data may include the device's 600 capability data 675 (including supported speeds and/or duplex modes), link quality metrics 680 (including link failure rate, data transfer rate, packet loss, latency, and jitter), network logs 685 (which record events within the network, such as auto-negotiation attempts, link establishment, and failure incidents).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method comprising:

sending, by a device via a 100BASE-T1L interface, a first capability data frame to a connected peer device;

receiving, by the device via the 100BASE-T1L interface, a second capability data frame from the connected peer device;

determining, by the device, a first highest common denominator (HCD) for network speed based on the first and second capability data frames;

establishing, by the device, a network link with the connected peer device via the 100BASE-T1L interface using the first HCD for network speed;

monitoring, by the device, a quality of the network link; and upon determining, by the device, that the quality of the network link falls below a defined threshold, sending a third capability data frame to the connected peer device that excludes the first HCD for network speed;

renegotiating, by the device, with the connected peer device to determine a second HCD for network speed, wherein the second HCD for network speed is lower than the first HCD for network speed; and adjusting, by the device, the network link with the connected peer device via the 100BASE-T1L interface to the second HCD for network speed.

2. The method of claim 1, wherein the first capability data frame comprises one or more network speeds supported by the device, and wherein the second capability data frame comprises one or more network speeds supported by the connected peer device.

3. The method of claim 1, wherein monitoring the quality of the network link comprises monitoring at least one of a link failure rate, a bit error rate, or a packet error rate.

4. The method of claim 1, further comprising:

assessing, by the device, whether the first HCD for network speed is a lowest speed that the device can operate on; and upon determining that the first HCD for network speed is the lowest speed that the device can operate on, maintaining the network link at the first HCD for network speed.

5. The method of claim 4, further comprising sending, by the device, an alert to a network monitoring system, the alert indicating that the network link is operating at a minimum capacity.

6. The method of claim 1, wherein the connected peer device performs at least one of operations comprising:

monitoring the quality of the network link; and upon determining that the quality of the network link falls below a second defined threshold, sending a fourth capability data frame to the device that excludes the first HCD for network speed.

7. A system of a device comprising:

one or more computer processors; and one or more memories collectively containing one or more programs, which, when executed by the one or more computer processors, perform operations, the operations comprising:

sending, by the device via a 100BASE-T1L interface, a first capability data frame to a connected peer device;

receiving, by the device via the 100BASE-T1L interface, a second capability data frame from the connected peer device;

determining, by the device, a first highest common denominator (HCD) for network speed based on the first and second capability data frames;

establishing, by the device, a network link with the connected peer device via the 100BASE-T1L interface using the first HCD for network speed;

monitoring, by the device, a quality of the network link; and upon determining, by the device, that the quality of the network link falls below a defined threshold, sending a third capability data frame to the connected peer device that excludes the first HCD for network speed assessing, by the device, whether the first HCD for network speed is a lowest speed that the device can operate on; and upon determining that the first HCD for network speed is the lowest speed that the device can operate on, maintaining the network link at the first HCD for network speed.

8. The system of claim 7, wherein the first capability data frame comprises one or more network speeds supported by the device, and wherein the second capability data frame comprises one or more network speeds supported by the connected peer device.

9. The system of claim 7, wherein, to monitor the quality of the network link, the one or more programs, which, when executed by the one or more computer processors, perform the operations comprising monitoring at least one of a link failure rate, a bit error rate, or a packet error rate.

10. The system of claim 7, wherein the one or more programs, which, when executed on any combination of the one or more computer processors, perform the operations further comprising:

renegotiating, by the device, with the connected peer device to determine a second HCD for network speed, wherein the second HCD for network speed is lower than the first HCD for network speed; and adjusting, by the device, the network link with the connected peer device via the 100BASE-T1L interface to the second HCD for network speed.

11. The system of claim 7, wherein the one or more programs, which, when executed on any combination of the one or more computer processors, perform the operations further comprising sending, by the device, an alert to a network monitoring system, the alert indicating that the network link is operating at a minimum capacity.

12. The system of claim 7, wherein the connected peer device performs at least one of operations comprising:

monitoring the quality of the network link; and upon determining that the quality of the network link falls below a second defined threshold, sending a fourth capability data frame to the device that excludes the first HCD for network speed.

13. One or more non-transitory computer-readable media containing, in any combination, computer program code, which, when executed by a computer system, performs operations comprising:

sending, by a device via a 100BASE-T1L interface, a first capability data frame to a connected peer device;

receiving, by the device via the 100BASE-T1L interface, a second capability data frame from the connected peer device;

determining, by the device, a first highest common denominator (HCD) for network speed based on the first and second capability data frames; and establishing, by the device, a network link with the connected peer device via the 100BASE-T1L interface using the first HCD for network speed, wherein the connected peer device performs at least one of operations comprising:

monitoring a quality of the network link, and upon determining that the quality of the network link falls below a defined threshold, sending a third capability data frame to the device that excludes the first HCD for network speed monitoring, by the device, a quality of the network link; and upon determining, by the device, that the quality of the network link falls below a defined threshold, sending a third capability data frame to the connected peer device that excludes the first HCD for network speed.

14. The one or more non-transitory computer-readable media of claim 13, wherein the first capability data frame comprises one or more network speeds supported by the device, and wherein the second capability data frame comprises one or more network speeds supported by the connected peer device.

15. The one or more non-transitory computer-readable media of claim 13, wherein the computer program code, which, when executed by the computer system, performs the operations further comprising:

renegotiating, by the device, with the connected peer device to determine a second HCD for network speed, wherein the second HCD for network speed is lower than the first HCD for network speed; and adjusting, by the device, the network link with the connected peer device via the 100BASE-T1L interface to the second HCD for network speed.

16. The one or more non-transitory computer-readable media of claim 13, wherein the computer program code, which, when executed by the computer system, performs the operations further comprising:

assessing, by the device, whether the first HCD for network speed is a lowest speed that the device can operate on; and upon determining that the first HCD for network speed is the lowest speed that the device can operate on, maintaining the network link at the first HCD for network speed.

17. The one or more non-transitory computer-readable media of claim 16, wherein the computer program code, which, when executed by the computer system, performs the operations further comprising sending, by the device, an alert to a network monitoring system, the alert indicating that the network link is operating at a minimum capacity.

18. The one or more non-transitory computer-readable media of claim 13, wherein, to monitor the quality of the network link, the computer program code, which, when executed by the computer system, performs the operations further comprising monitoring at least one of a link failure rate, a bit error rate, or a packet error rate.

* * * * *